United States Patent [19]

Russ

[11] Patent Number: 5,446,857
[45] Date of Patent: Aug. 29, 1995

[54] METHOD AND APPARATUS FOR WRITING FILES ON NONERASABLE STORAGE MEDIUM

[75] Inventor: Craig F. Russ, Berwyn, Pa.

[73] Assignee: Unisys Corporation, Blue Bell, Pa.

[21] Appl. No.: 898,109

[22] Filed: Jun. 12, 1992

[51] Int. Cl.6 .................. G06F 12/00; G06F 13/00
[52] U.S. Cl. .................... 395/427; 395/500;
395/600; 369/99; 369/275.3; 364/DIG. 2;
364/952; 364/952.31; 364/966; 364/968;
364/962
[58] Field of Search .......... 395/425, 600, 500;
369/13-16, 99, 275.1, 275.2, 275.3

[56] References Cited

U.S. PATENT DOCUMENTS

| | | | |
|---|---|---|---|
| 4,947,367 | 8/1990 | Chang et al. | 395/500 |
| 4,953,122 | 8/1990 | Williams | 364/900 |
| 4,974,197 | 11/1990 | Blount et al. | 364/900 |
| 5,029,125 | 7/1991 | Sciupac | 364/900 |
| 5,040,110 | 8/1991 | Miki et al. | 364/200 |
| 5,073,887 | 12/1991 | Takagi et al. | 369/100 |
| 5,218,685 | 6/1993 | Jones | 395/425 |

FOREIGN PATENT DOCUMENTS

0472484A2  2/1992  European Pat. Off. .

OTHER PUBLICATIONS

Yasushi Ashikaga, et al., "CD-ROM Premastering System Using CD-Write Once", Oct., 1990, *Fujitsu-Scientific and Technical Journal*, vol. 26, No. 3, Kawasaki, Japan, pp. 214–223.
ISO 9660-Information Processing-Volume and file structure of CD-ROM for information interchange, First Edition, International Organization for Standardization, 1988, UDC 681.327.28.

*Primary Examiner*—Paul V. Kulik
*Attorney, Agent, or Firm*—Nathan Cass; Mark T. Starr

[57] ABSTRACT

Method and apparatus for writing data to files from a computer system to a Write Once Read Many (WORM) Disc medium which results in a creation of an ISO 9660 standard disc is disclosed. The method and apparatus each efficiently manages writes to WORM medium in the creation of a file structure that conforms to ISO standard 9660 which governs management of CD-ROM disc files. The method and apparatus are efficient both in terms of the time required to perform such writes and in the amount of medium consumed as overhead. In addition, the invention provides a method and apparatus for writing to WORM disc in which there is a high degree of confidence that the information written is indelible.

19 Claims, 9 Drawing Sheets

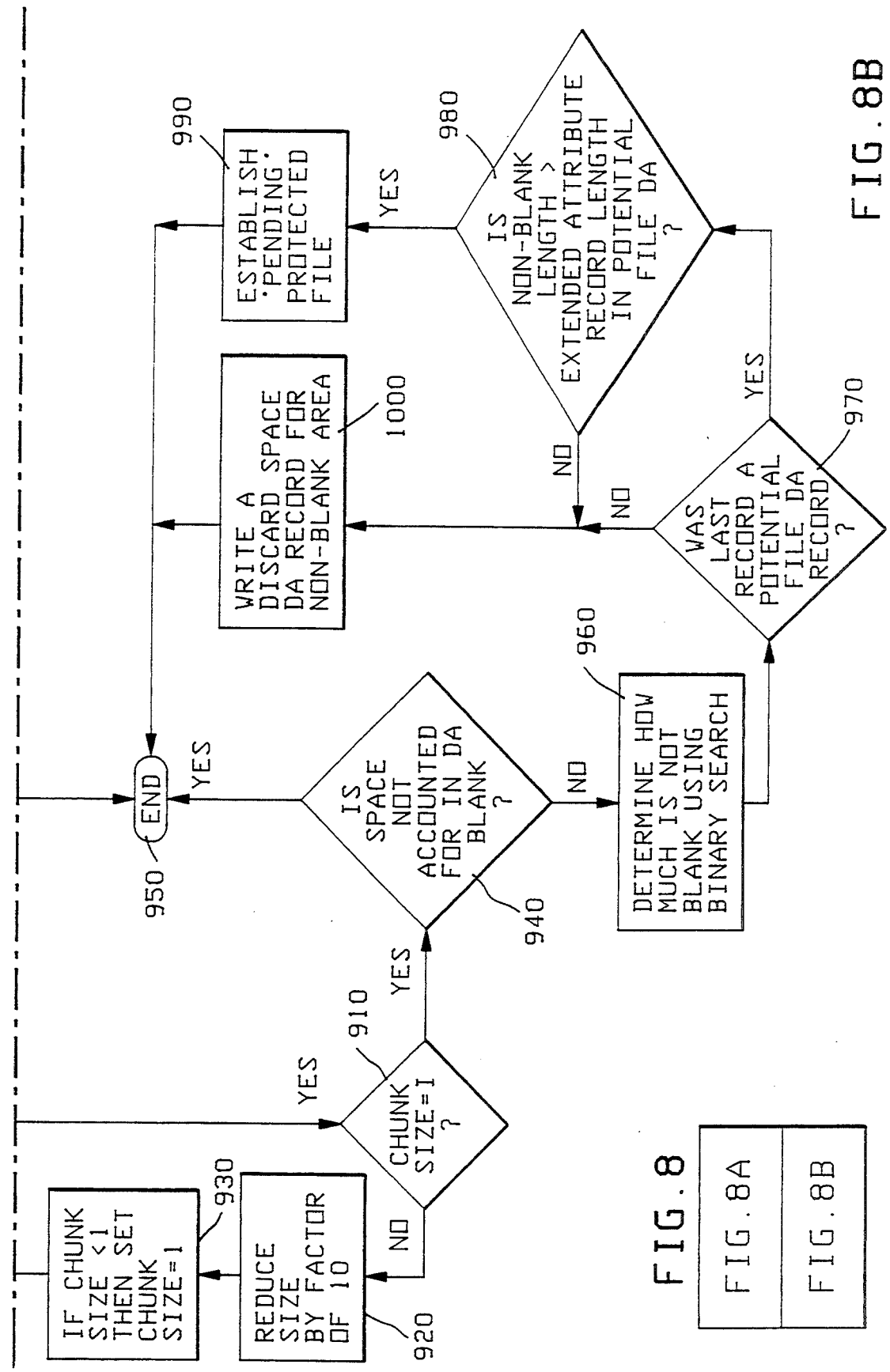

METHOD AND APPARATUS FOR WRITING FILES ON NONERASABLE STORAGE MEDIUM

FIELD OF THE INVENTION

The present invention relates to a method and apparatus for performing data transfer between a computer operating system and a peripheral device in the form of files and the management of such files. In particular the method and apparatus apply to writing such files on a Write Once Read Many (WORM) Medium to create an industry standard formatted disc which has a high degree of indelibility.

BACKGROUND OF THE INVENTION

Two common forms of storage device on a computer system are the magnetic disc drive and the magnetic tape drive. Computer systems have established methods of handling each of these two types of storage peripherals. Media created on such devices for a given standard are portable to other systems which employ devices which adhere to the same standard.

Recently another type of storage peripheral has become available on many systems; the compact disc device. It is common for such devices to be read-only in nature. A computer system cannot write information to media on such devices but can only read information from media on the device. Compact discs provide the advantage of a high volume of storage in a relatively small package which is highly portable. In addition, the use of such discs permits access to the information in a rapid manner.

An industry standard for file management on CD-ROM disc has been promulgated by the International Standards Organization under the designation ISO 9660. This standard has been adopted by much of the industry and there are numerous systems which read CD-ROMs which adhere to the ISO 9660 standard.

There is a storage device which permits a degree of output capability for optical media. The device is known as a Write Once Read Many (WORM) disc drive and it provides the capability to perform a write to an optical medium. Once written, the medium is not erasable.

There is no information management system standard for writable optical discs. If such discs are managed in the same manner as a magnetic disc file, such as that used on hard disc or floppy disc, there are a number of drawbacks for a WORM device. Specifically, such methods tend to be extremely slow and to waste much of the available medium.

The methods are slow because the file management scheme requires that file allocation tables and directories be maintained on the medium with the data. Each update to the file causes updates to the directories, tables, and the data area. This is not a problem with magnetic medium since it is erasable and does not result in a loss of storage capacity. However, on WORM medium each time the file is updated, the medium's storage capacity is reduced. Multiple recordings of the file allocation tables and directories during a single update can become especially slow since the information must be rewritten each time.

One means to reduce the performance and storage capacity impact of maintaining the necessary tables and directories to manage a WORM medium in the same manner as a magnetic disc is to employ a cache and to maintain a temporary copy of the necessary data structures in the cache. However, this leads to obvious vulnerabilities since a failure of the cache results in loss of the data structures. This risks loss of the data written to the medium due to an inability to locate it.

Another problem with managing WORM media like magnetic disc media is managed is that the storage capacity of the medium constantly decreases as overwrites to the existing files occur. In addition, the ability to overwrite in such files may suddenly disappear. That is, while the length of a file might not change, changes within that file may cause the entire WORM disc space to be exhausted. Eventually, overwrites to the file will no longer be possible when all available space on the disc has been used once. It is not a true erasable disc.

Another problem with this method is that it masks whatever indelibility characteristics the WORM device might otherwise possess. Such indelibility can be valuable in employing the medium as a form of permanent archive suitable for evidentiary purposes. This value is masked because the attempts to tamper with the data after it is written would actually be aided by the system which permits data to be overwritten in a logical fashion. Only an arduous backtracking of the historical sequence of writes to the disc could detect when a malicious or accidental altering of the data was performed, if at all.

Yet another drawback with this approach involves the method chosen to manage files on the medium. Depending on the method, a medium may only be usable in a system which created it.

Another possibility is to manage a WORM device as a tape drive. Like the disc solution above, this method is fraught with problems. For instance, this method hides the random access nature of WORM devices. It also hides the shared use capability of a WORM device. That is the ability for more than one user to access files on the device at the same time. Such methods also often employ the buffering described above which risks the integrity of the data.

SUMMARY OF THE INVENTION

It is an object of the present invention to provide a method and apparatus of writing files to a WORM medium which makes more efficient use of the medium storage capacity than the above methods.

Another object of the present invention is to perform writes and reads to such medium in a rapid and efficient manner.

A further object of the present invention is to perform writes to create a disc that adheres to the ISO 9660 standard. The disc may then be read by any compatible device which adheres to this standard.

Still another object of the present invention is to accomplish all of the above in a manner which enhances the degree of confidence in the indelibility of output to a WORM device.

Yet another object of the present invention is to accomplish the above in a manner which does not endanger the integrity of the data written to the disc.

A still further object of the present invention is to accomplish all of the above in a manner which permits the advantageous use of the multiple read capability and random access nature of WORM devices.

The above objects are accomplished by the present invention by employing a method whereby a directory audit structure is maintained on the medium. This structure has at least one entry for each file created on the medium and each entry comprises enough information to construct a permanent disc format directory. The directory audit is maintained on the disc beginning at the highest logical address portion of the disc and propagating to lower addresses as changes occur.

Data is stored on the disc beginning at the lowest address portion of the disc but beginning adjacent to the area reserved for the permanent Primary Volume Descriptor under the ISO 9660 standard. The data is written in a pattern which emanates upward to higher addresses of said disc.

When enabled for write mode, access to the disc is managed by means of a write phase directory stored in core memory. This directory is similar in nature to that dictated by the ISO 9660 standard. Output to the medium is managed in a manner which provides a high degree of confidence that the data so written is indelible.

The present invention include a method for performing a "freeze" action when all files that are to be written to a given medium are complete. A freeze is defined as a transition from a Write phase of the medium to a read-only phase result in a complete ISO 9660 standard format read-only disc. During a freeze a permanent ISO 9660 disc format directory structure is written to the disc in accordance with the ISO standard. Once frozen, the disc is fully portable to any compatible device which supports the ISO 9660 standard.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
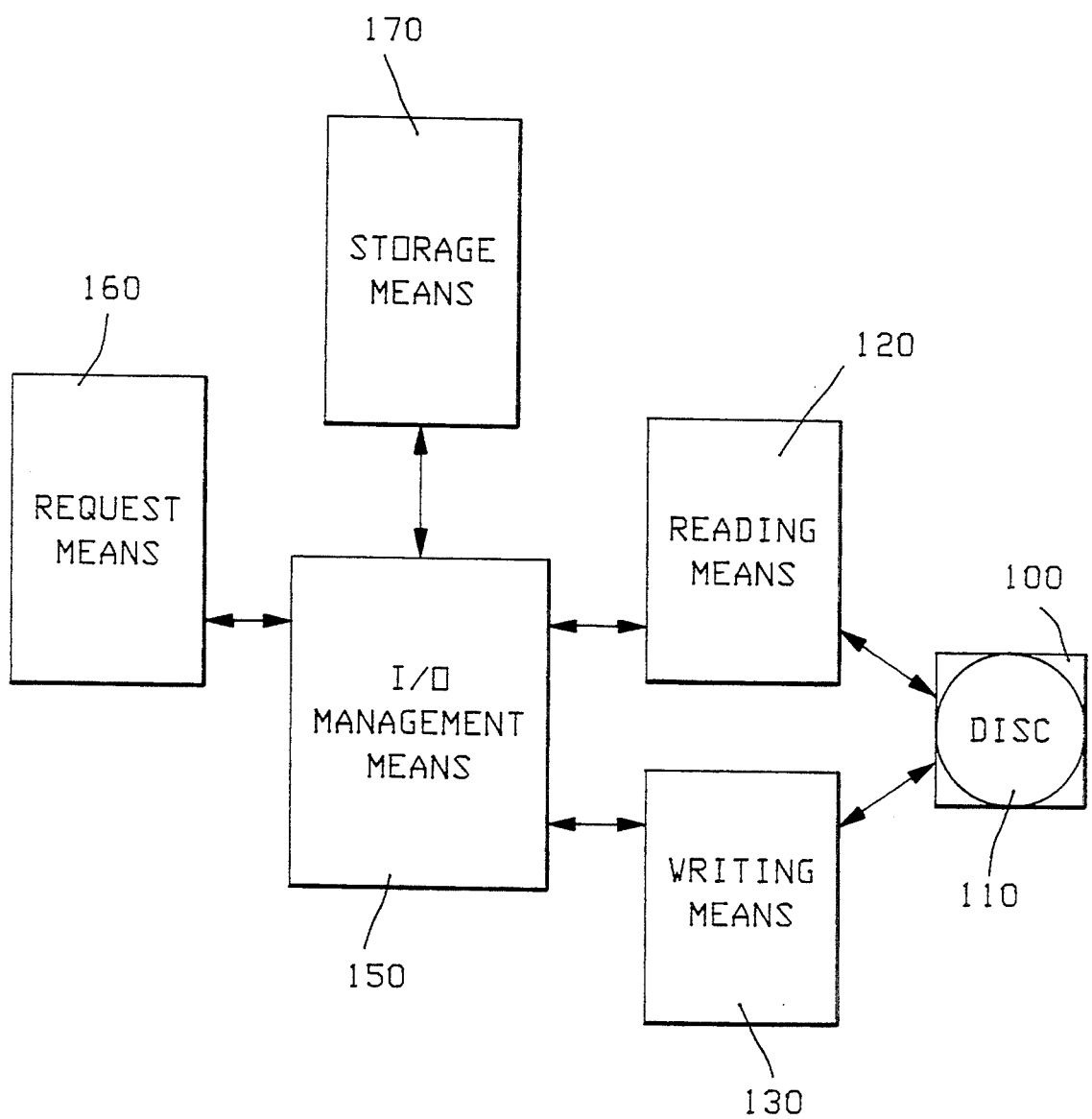
FIG. 1 shows a system in which the preferred embodiment of the present invention is incorporated.

With reference to FIG. 1, which shows a system in which the preferred embodiment of the disclosed invention is employed, there is a disc driving means 100 for driving a disc on which data and other information are stored. Such disc driving means is a WORM (Write Once Read Many) device in the preferred embodiment. The disc driving means contains at least one disc medium 110 on which the information and data are to be stored.

The disc driving means 100 is coupled to a reading means 120 which permits the information stored on the disc 110 to be retrieved from the disc. In the preferred embodiment the reading 120 means operates in response to ISO 9660 standard commands which govern the use of read-only formatted discs.

Writing means 130 is also coupled to said disc driving means 100 and it permits data to be stored on said disc 110 in response to a write command.

Both reading means 120 and writing means 130 are coupled to I/O management means 150. The I/O management means 150 manages output to said disc 110 such that the data on said disc is organized in conformance with the ISO 9660 standard. The I/O management means 150 also provides instructions to reading means 120 to retrieve data from said disc 110.

The I/O management means 150 performs these actions in response to requests from a request means 160. In the preferred embodiment such request means 160 is the I/O subsystem of the A-Series MCP operating system sold by Unisys Corporation for its A-Series line of computers. The I/O management means 150 is also coupled to a storage means 170 which it employs to perform its functions. Said storage means 170 contains the file management information used by said I/O means 150 to perform writes to and reads from said disc 110. In the preferred embodiment this file management information includes write phase records which are further described herein.

Figure 2:
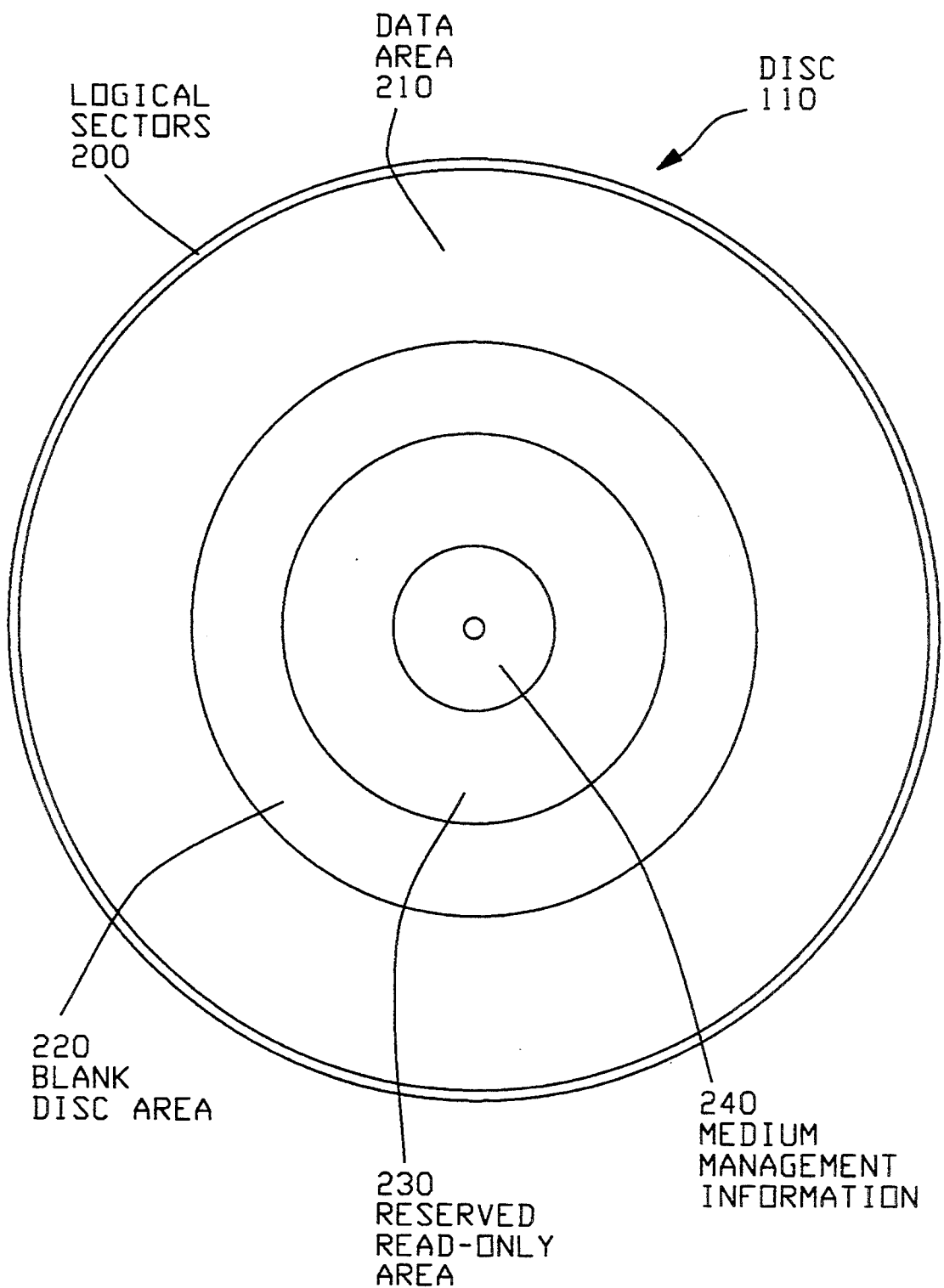
FIG. 2 depicts the organization of the information stored on the disc in the preferred embodiment of the present invention.

FIG. 2 depicts the layout of the data on said disc 110 in the preferred embodiment. In this embodiment, the data space is shown with the lowest address at the outer radius of the medium and with the data using only one surface of the medium. However, the invention may also be employed with a different logical addressing scheme for the medium. For instance, the invention could be employed with a logical addressing scheme with the lowest address at the innermost radius of the medium. The invention may also be employed in an embodiment which uses of both surfaces of the disc for storage.

Beginning at the lowest address portion of the disc, the first area 200 comprises 18 logical sectors; 16 logical sectors reserved in accordance with the ISO 9660 standard for undefined system use and two sectors for volume descriptors. In the preferred embodiment sector 15 of area 200 is used to store the partial read-only volume descriptor described further hereinafter. Logical sector 16 of this area 200 is defined under the ISO 9660 standard as a possible location for the standard primary volume descriptor (PVD). The ISO 9660 standard specifies a list of descriptor information which may be included on the medium beginning at logical sector 16. Of this list, only the PVD and the Volume Descriptor Set Terminator are required under the standard.

While the present invention may be employed with a method that stores any subset of the permitted information, the preferred embodiment described herein only stores the PVD at logical sector 16. The PVD is Written when all output to the disc is complete. In the present embodiment this action is performed during a "freeze" action which is also described further herein. The area adjacent to the reserved area 200 is the data area 210 for data written to files 210 on the disc. The area next to the data area 210 toward the higher address portion of the disc is that in which no information has been written 220 or virgin disc area. This area 220 is blank and an attempt to read this area returns a blank check error, the importance of which is described further herein.

The area adjacent to the virgin disc area 220 toward the higher address portion of the disc is that area 230 reserved for the permanent read-only disc format directory. This directory is constructed and written during a freeze to yield a disc which is read-only and formatted in conformance with the ISO 9660 standard.

The highest address region 240 on the disc 110 is the portion used for the medium management information. In the preferred embodiment this information includes directory audit records. As shall be described herein, these directory audit records facilitate the creation of a medium with an ISO 9660 standard format in an efficient and safe manner using a WORM device.

Figure 3:
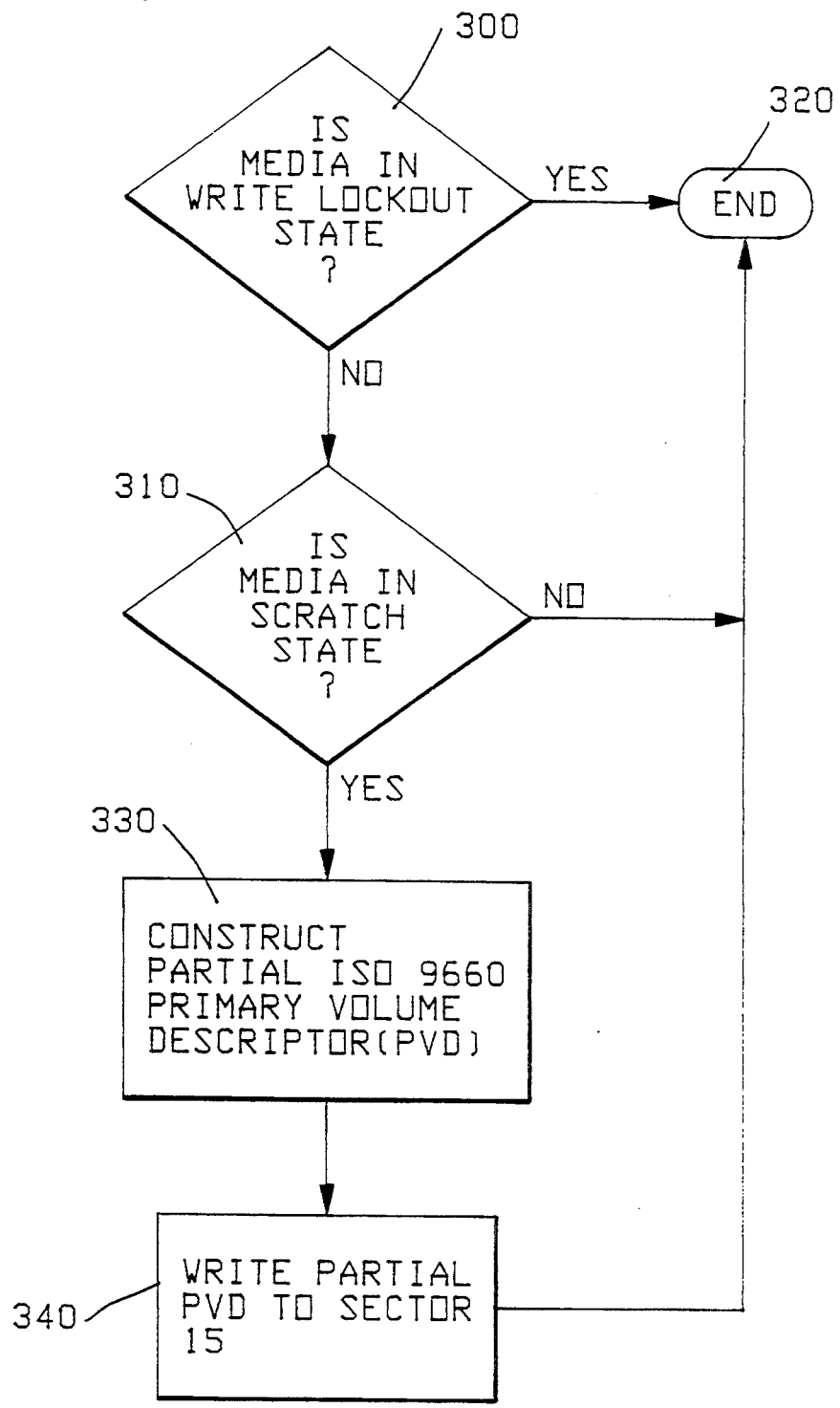
FIG. 3 shows the steps for initializing a WORM medium for output in the present invention.

Referencing now FIG. 3, the process of initializing a WORM medium for use in the present invention is described. Initially, a WORM medium is expected to be virgin medium. That is, no information has been written to any portion of the medium. In the preferred embodiment this state is verified by performing a read at logical sector 16 of the disc 300. If a blank check error is returned the medium is considered to be write capable. However, if valid data is returned then the data is examined to determine if it comprises an ISO 9660 primary volume descriptor label. If so, this indicates that the medium is in read-only state and the medium will not be initialized or used for output 320.

If the disc is acceptable for output, a read is performed at logical sector 15 to determine if a partial ISO 9660 primary volume descriptor is present 310. If valid data is returned and a partial descriptor is found then the disc has already been initialized and the process ends 320. If a blank check is returned then it is assumed that the disc is completely blank and the initialization process continues.

A partial ISO 9660 Primary Volume Descriptor (PVD) is constructed 330 for the disc. The PVD is then written 340 to logical sector 15 in the reserved area 200 in conformance with the ISO standard. This completes initialization of the medium 320.

Figure 4:
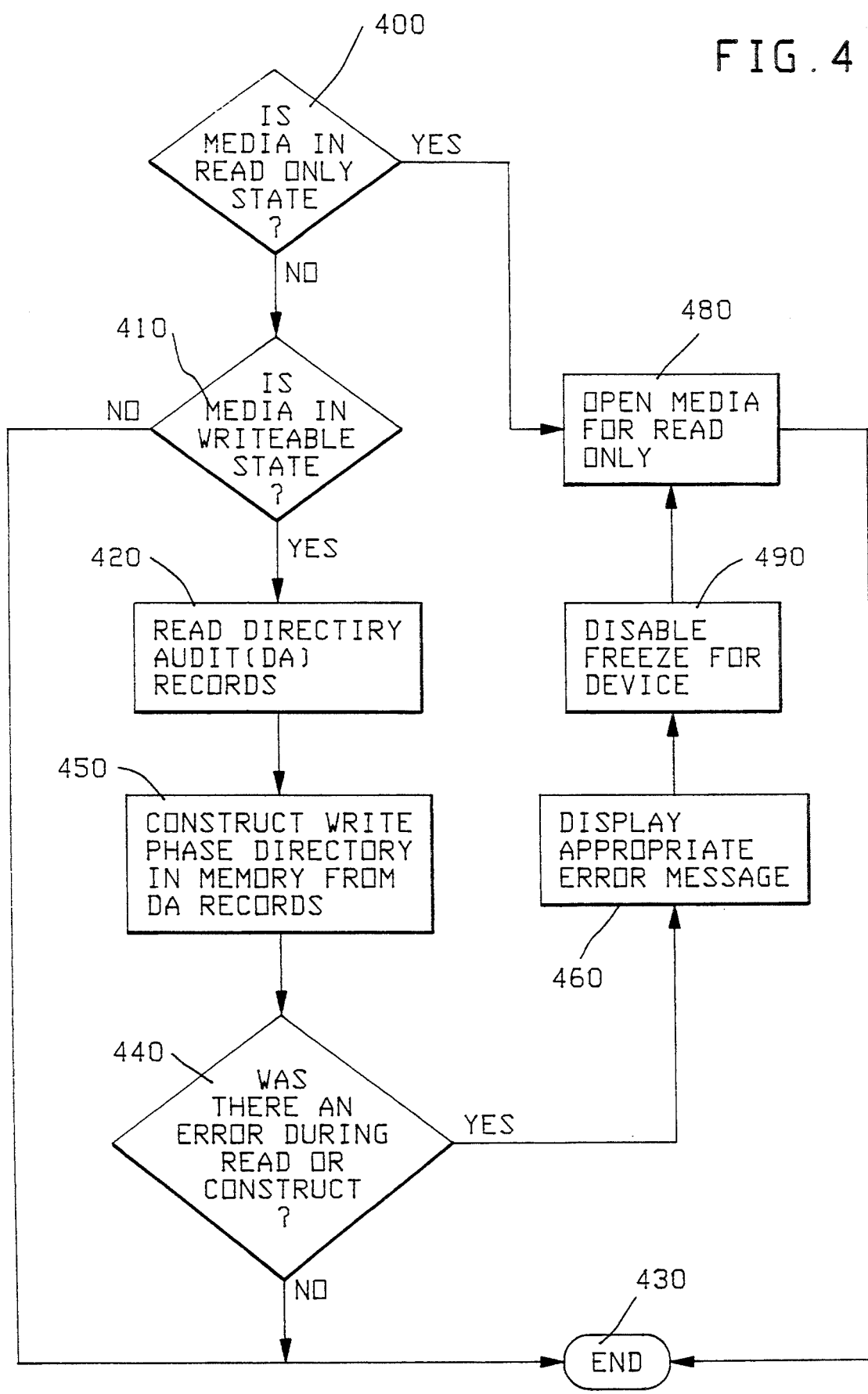
FIG. 4 details the steps employed to open the medium for the write phase after it has been initialized in the present invention.

FIG. 4 details the steps employed to open the medium for the write phase after the medium has been initialized. The medium is checked to see that it is not read-only format 400 by reading logical sector 16. If valid data is returned then the process ends and the disc is open for read-only access 480. If a blank check error is returned then a read at logical sector 15 is performed 410 to verify that the medium has been initialized and is in a writable state. If a blank check is returned or if the data returned does not contain a partial ISO 9660 Primary Volume Descriptor then the medium is not opened at all and the process ends 430.

If a partial ISO 9660 PVD is returned from logical sector 15 then the process reads the medium management information 420 from area 240 of FIG. 2. This information describes the files stored on the medium to date.

In the present embodiment the medium management information includes directory audit (DA) records. The definition of each type of DA record is shown in hereinafter. Each DA record is 512 bytes long and is recorded in the first 512 bytes of a logical block. Directory audit records are recorded in a contiguous sequence of logical blocks in descending order starting with the highest number logical block on the medium in the medium management information area 240 in FIG. 2. The sequence of DA records is normally terminated with virgin disc space or a freeze type DA record. The directory audit records contain all the information necessary to build the file management information in core memory which permits management of the disc during the write phase.

As the DA records are read, the write phase directory is constructed 450 using this information. This process is described further herein in FIG. 8. All directory inquiries, opens and writes for existing files are processed using this in-core write phase directory. If the result of the medium management information read is successful 440 then the process ends 430.

If an error occurred during the read of the DA records or if a data inconsistency is encountered, a description of the error is displayed and logged 460. Directory freezes on the medium will be disallowed 490. The medium will then be placed on line and made usable via the in-core directory in a read-only fashion 480. Only those files whose directory audit records are located prior to the point of the failure will be visible.

Figure 5:
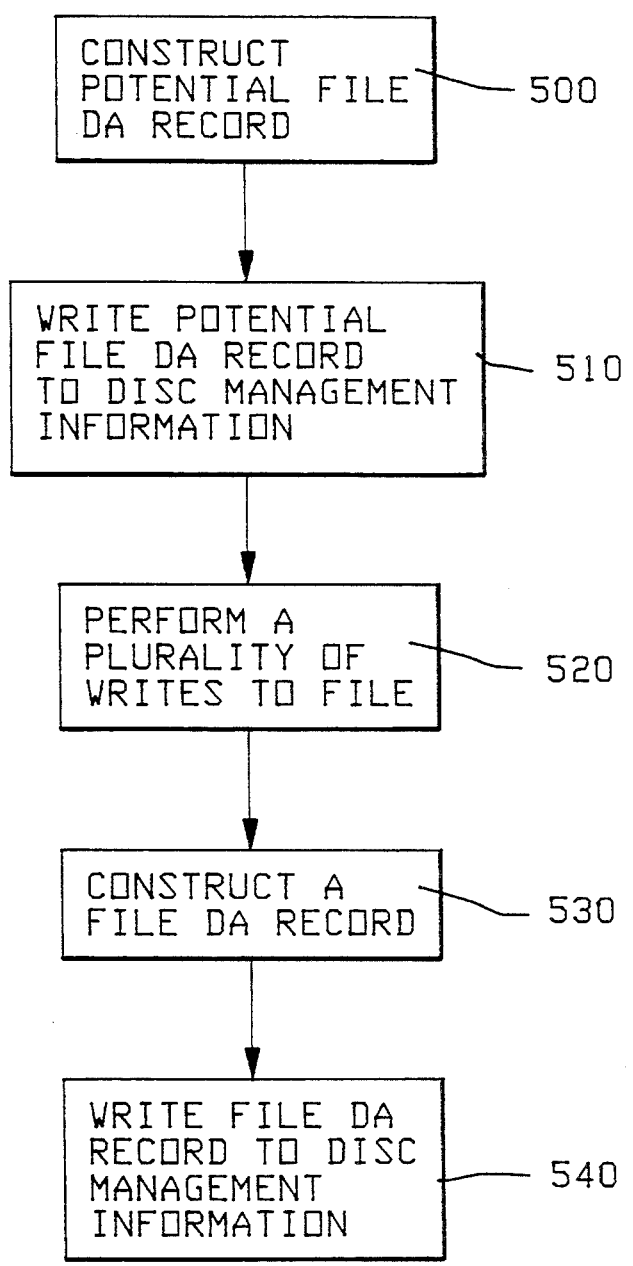
FIG. 5 describes the steps employed to create a file during the write phase in the present invention.

FIG. 5 describes the steps employed during the write phase of a file. There are two methods of creating a file under the present method. The first one described is referred to as the "protected" mode of creating a file. When a protected mode file is opened, a potential file DA record is created 500 describing the new file. The potential file DA record is written to the medium management information 510 on the medium at location 240 in FIG. 2.

Next, a plurality of writes are performed to store data in the file 520. If a system interruption occurs before the file is closed, it will be shown herein that a protected mode file is recovered during a rebuild of the write phase directory to the last physical sector written to the file. When a writable protected mode file is successfully closed, a file DA record is constructed 530 and written to the medium management information 540 stored at location 240 in FIG. 2. This completes the creation of the file.

Under ISO 9660 standard level 2 of interchange a file is defined as a single file section, or row, on the medium. As such, in the preferred embodiment under this level 2 of interchange, output is not permitted to a file after the file is closed. However, level 3 of interchange under ISO 9660 provides a definition of a file as multiple rows. Using this standard, a closed file may be reopened for output at a later time with the output directed to a new row. The multiple rows resulting are concatenated into a single file under the level 3 interchange definition.

In the preferred embodiment, there is a second method of creating a file on a WORM medium which does not employ the protected mode shown in FIG. 5. For a non-protected mode file, the file creation begins at step 520 by performing a plurality of writes to the medium in the data area 210. A close file command causes a file DA record to be constructed 530 and written 540 to the medium management information area of the disc 240 completing the creation of the file.

The difference between the non-protected mode and the protected mode described above is that no potential file DA record is created or written. As will be further detailed herein, this means that if a system interruption occurs during the creation of a file, all data written to the disc is discarded during a rebuild of the write phase directory. While this mode does not provide the degree of recoverability that the protected mode does, the non-protected mode greatly simplifies the implementation of programs which utilize WORM files under this method since such programs need not handle a recovered protected mode file in the pending state.

Figure 6:
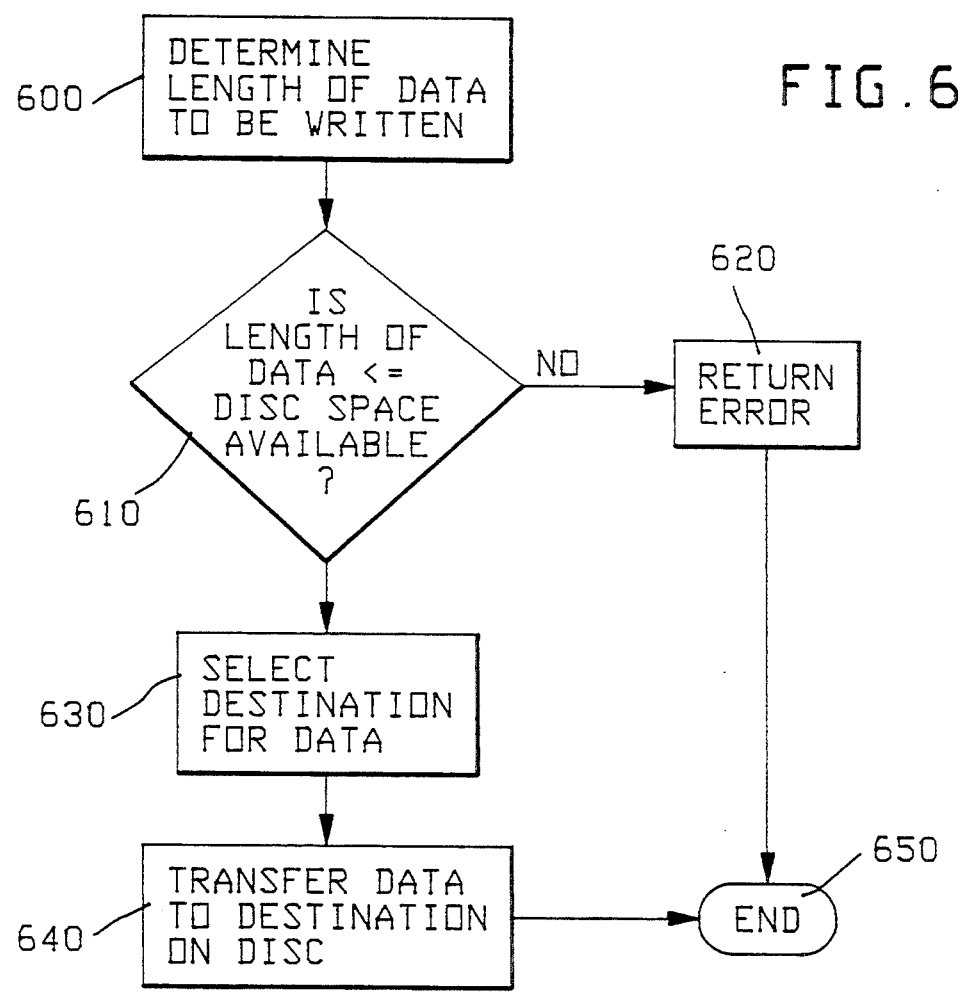
FIG. 6 describes the sequence of steps which occur during one of the plurality of writes which occur during the creation of a file.
Figure 9:
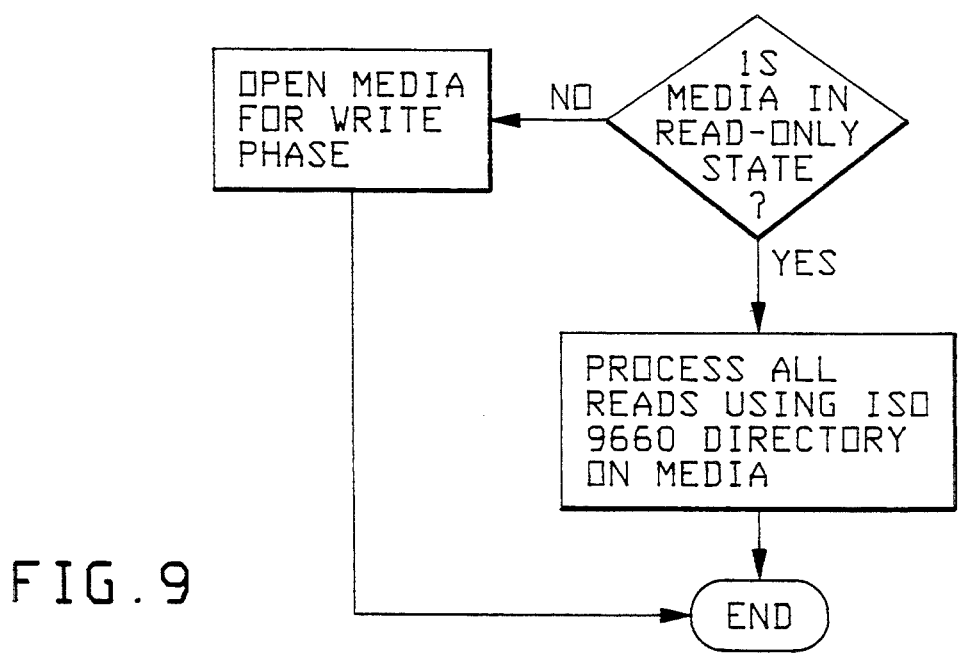
FIG. 9 shows steps which occur when the disc media is opened for a write phase.

FIG. 6 describes the sequence of steps which occur during one of the plurality of writes at step 520 in FIG. 5. In response to a write command, the length of the data to be written is determined 600. Next, the amount of available disc space in area 220 of the disc is determined and compared to the length to be written 610. If the length of data to be written is less than or equal to the disc space available then the write operation proceeds. If there is insufficient disc space, an error is returned 620 and the process ends.

The amount of disc space available 220 is equal to the amount of virgin disc space less the sum of the area required for the read-only format directory at area 230 plus the area required for the file DA record for the current file. The virgin disc area is that space between the data area 210 and the medium management information area 240.

Assuming there is sufficient disc space available to write the data, the location on the disc at which to write the data is selected as the destination 630. In the preferred embodiment, this is the next area of virgin disc space 220 adjacent to the already written data area 210. The data is then transferred to the destination on the disc 640 and the write is complete 650.

In the preferred embodiment of the present invention only one file may be open for output at any given time. File data is written contiguously to ascending physical addresses starting adjacent to the area reserved for label information 200. The series of reads and writes for the file must be such that all writes append contiguously to the current logical end of file. When the file is closed the length of the file is truncated to the size of the area to which data was actually written. Any number of existing files on a WORM medium may be opened for read-only access at the same time. Also, an existing file on a WORM medium may be opened by any number of logical files for read-only access at the same time.

Figure 7:
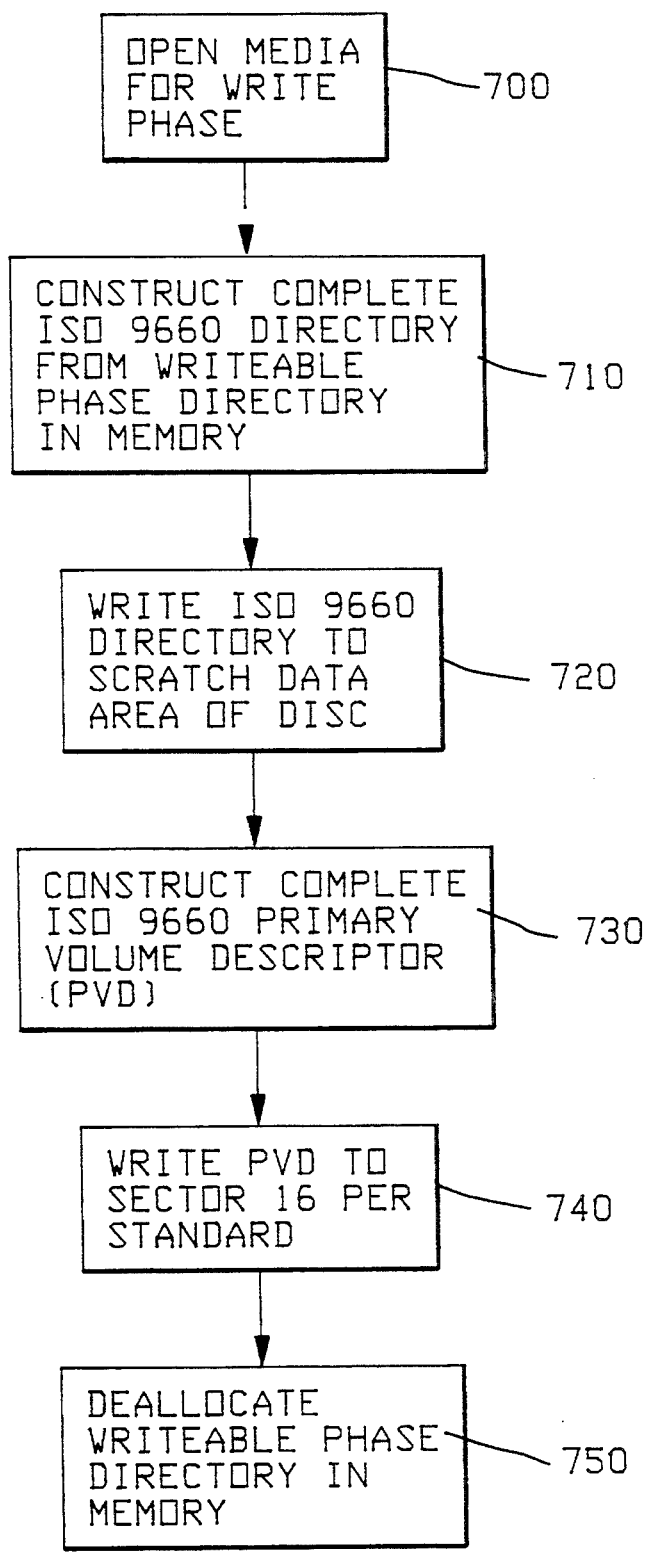
FIG. 7 depicts the steps employed when performing a freeze action in the present invention.

The present invention includes a method for performing a "freeze" action when all files that are to be written to a given medium are complete. A freeze is defined as a transition from a write phase of the medium to a read-only phase resulting in a complete ISO 9660 standard format read-only disc. The steps for performing a freeze are described in FIG. 7.

First, the medium must be opened for write phase 700. Then, a freeze type DA record is written to indicate a freeze was begun. As will be shown hereinafter, this permits an interrupted freeze to be detected and completed.

Next, a complete ISO 9660 read-only directory structure, including path tables, is constructed using the write phase directory structure in memory 710. This complete directory is written to the medium in accordance with the ISO 9660 standard to a portion of the area shown as area 230 in FIG. 2.

Next a complete ISO Primary Volume Descriptor (PVD) label is constructed 730 from the write phase directory. The PVD label is written to logical sector 16 and a Volume Descriptor Set Terminator is written to sector 17 in accordance with the ISO 9660 standard 740. Finally, the write phase directory in memory is deallocated 750. At this point the medium is no longer writable. All reads for the medium are handled in accordance with the ISO 9660 standard directory and method.

A freeze has many beneficial effects. By freezing a WORM medium no further files may be added to the medium. This is quite useful when the WORM is employed as an archive device. Another advantage is that, upon completion of the freeze operation, the in-core write phase directory is deallocated. This releases a significant amount of memory if the directory structure is complex or contains many files. Another advantage of a freeze is that the cost of rebuilding an in-core write phase directory on subsequent uses of the medium is eliminated because the disc contains a standard ISO 9660 directory. This also permits the WORM medium to be placed on any system with the sufficiently complete implementation of the ISO 9660 standard for a disc driving means device.

Figure 8A:
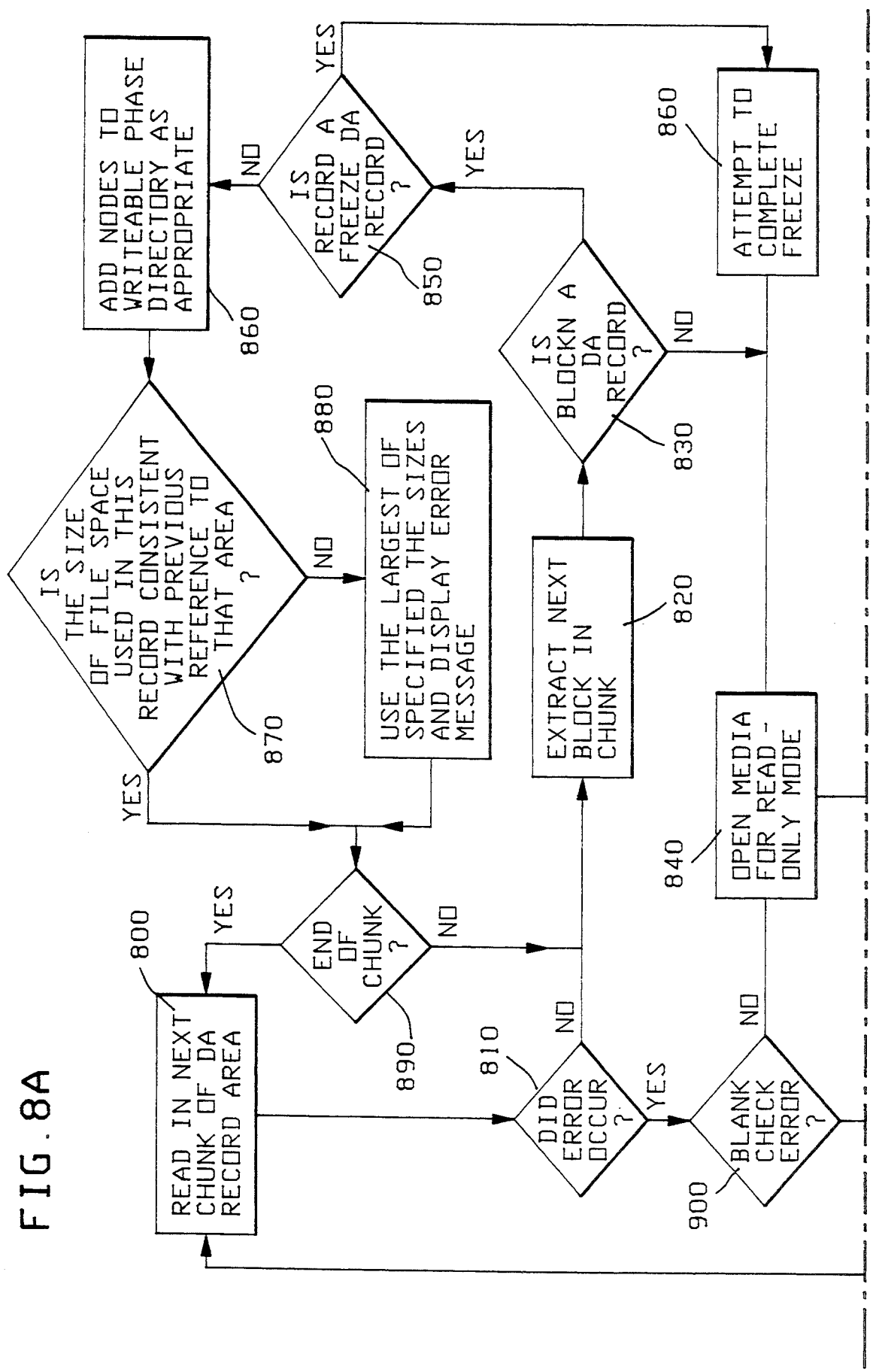
FIG. 8 shows the method for building the write phase directory in core memory using the medium management information stored on the medium.

In the preferred embodiment of the present invention the method of building the in-core write phase directory from the medium management information is shown in FIG. 8. First a chunk of data is read 800 from the medium management information area 240. A check is done to see if a read error occurred 810. If not, a block of the chunk is extracted 820 to get the next DA record. A check is performed 830 to see if the block is actually a DA record. If not, the medium is opened for read-only mode 840 and processing end.

If the block is a DA record 830 then a check is performed 850 to determine if the DA record is a freeze type DA record. If so, a freeze is attempted 860, the medium is opened for read-only mode 840, and the process ends 950. If the record is not a freeze type DA record 850 then the process adds a file node to the write phase directory in core memory as appropriate for this DA record 860.

Next, a check is performed to determine if the size of the file space referenced by this record entry is consistent with previous references to the same area of the medium 870. For instance, if a discard type DA record was previously read which referenced a portion of the area referenced by this DA record, then there is a potential conflict over the use of the given area of the medium. If the size references are inconsistent then the error is noted and displayed 880. In addition, the largest of the sizes specified for the area is employed to reference this area for the write phase directory in core memory.

Once the size of the area is determined and the error message, if any, has been displayed, processing continues at 890 to determine if any more information remains in the current chunk. If so, processing returns to extract the next block in the chunk 820. If no information remains in the current chunk, processing resumes at 800 to read the next chunk of the DA area on the medium.

Eventually, the size of the chunk read 800 will exceed the size of the medium management area remaining to be read. In the preferred embodiment, this is indicated by an blank check error result from the read attempt 800. When the result of the chunk read 800 indicates an error 810, the process then checks if the error was a blank check error 900. If so, the size of the chunk read is compared 910 to a size of 1. If the size is not equal to 1 then the size is reduced 920 by a factor of 10. If this reduction causes the size of the chunk to be read to be less than 1, the size of the chunk is set 930 equal to 1 after which another attempt to read the DA area is made 800.

If the check 910 reveals that the size of the chunk read equals 1, it indicates that all of the DA information has been read. A check is now performed 940 to verify this indication by reading the area 220 of FIG. 2 immediately adjacent to the data area 210, which is expected to be virgin medium. If a blank check error is returned for this read 940, this verifies that the process of reading the DA area has completed successfully and the process ends 950.

If the read of the virgin area 220 returns valid data 940 then the process determines how much of the expected blank space is actually non-blank 960. This is accomplished by means of a binary search of the region.

Once the size of the non-blank area is known, a check is performed to see if the last DA record read was a potential file type DA record 970. If so, the length of the non-blank region is compared to the extended attribute record length in the potential file type DA record. If the non-blank length exceeds the potential file DA record length then an appropriate pending protected file is established 990. However, if the non-blank length is less than the potential file DA record length then the non-blank area is discarded 1000.

If the check 970 showed that the last DA record read was not a potential file type DA record then the non-blank space is also discarded. Once the non-blank region has either been discarded or established as a pending protected file processing ends 950.

While the above preferred embodiment disclosed a method of creating an ISO 9660 formatted disc employing a WORM device, it is not intended to be limited to such an embodiment. The format chosen to manage the disc may be any appropriate read-only format.

Some advantages of the present invention should now be readily apparent. For instance, media created with the present invention are readily useable by a variety of devices which read media created under the ISO 9660 standard.

Another advantage is that media created with the present invention has a high degree of indelibility. For terms of this discussion, indelibility is defined as immunity to accidental or malicious modification of previously written data. Because of the manner in which the directory structures are built and managed, such modifications to previously written data are detected by the system.

For instance, data is only referenced by means of a directory structure built from the DA records. When the DA records are processed during an open, the size of the space referenced by a record is compared to any previous DA record references. Any discrepancy will cause an error to be displayed and logged and the maximum of the two discrepant values will be used. Thus, a malicious attacker who gained direct access to a media and appended to the directory audit structure could not in any way affect files previously made permanent nor files written by the system in the future.

Similarly, the check of virgin data space performed at the end of an open also reduces the opportunity for an unauthorized modification to occur. If the read of the virgin space does not return the expected blank check, then a binary search is performed to determine the extent of the non-virgin area. Assuming the last DA record was not a potential file DA record, a discard space DA record is created and added to the directory structure to remove this non-virgin area from use.

Another advantage of the present invention is that the implementation of the protected mode file facilitates the maintenance of a transaction audit of output to the medium.

The above described embodiment is just an example of the present invention and it will therefore be apparent to those skilled in the art that many modifications and variations may be made without departing from the scope of the present invention. It is therefore to be understood that the present invention may be practiced otherwise than an specifically described within the scope of the appended claims and equivalents thereto.

The following is a description of an exemplary directory audit structure which may be employed in the previously described preferred embodiment.

Directory Audit Structure

The design follows the style of ISO 9660 both in the design and documentation of the directory audit records. Note that Byte Positions in the tables below are origin one.

Entries in the directory audit structure will be known as Directory Audit Records. Each Directory Audit Record will be 512 bytes long, and will be recorded in the first 512 bytes of a Logical Block. Directory Audit Records will be recorded in a contiguous sequence of Logical Blocks in descending order starting with the highest numbered Logical Block on the media. The sequence will be considered to terminate on the first occurrence (reading descending addresses) of Blank Check RD (unwritten Logical Block), Parity Error RD, or Freeze Directory Audit.

A . . . File Description Directory Audit

The File Description Directory Audit shall identify a file which has been made permanent.

| BP | Field Name | Content |
| --- | --- | --- |
| 1 | Directory Audit Type | numerical value |
| 2 to 11 | Standard Identifier | CDDIRAUDIT |
| 12 | Directory Audit Version | numerical value |
| 13 to 46 | Audited Directory Record | 34 bytes |
| 47 to 54 | Waste Length | numerical value |
| 55 | Number of File Identifiers | numerical value |
| 56 to 511 | File Identifiers | numerical values, d-characters, SEPARATOR 1 |

1. . . Directory Audit Type (BP 1)

This field shall specify an 8-bit number indicating that the Directory Audit Record is a File Description Directory Audit.

The number in this field shall be 0.

This field shall be recorded according to ISO 9660 7.1.1.

2. . . Standard Identifier (BP 2)

This field shall identify the record as a Directory Audit Record.

The characters in this field shall be CDDIRAUDIT.

The characters in this field shall be recorded in ASCII.

3. . . Directory Audit Version (BP 12).

This field shall specify as an 8-bit number an identification of the version of the specification of the File Description Directory Audit.

1 shall indicate this version.

This field shall be recorded according to ISO 9660 7.1.1.

4. . . Audited Directory Record (BP 13)

This field shall contain a Directory Record for the subject file. This Directory Record shall have a Directory Identifier consisting of a single (02) byte.

This field shall be recorded according to ISO 9660 9.1.

5. . . Waste Length (BP 47)

This field shall specify as a 32-bit number a number of unused Logical Blocks which immediately follow the Extent described in the Audited Directory Record.

If the Data Length of the Audited Directory Record is zero, this field must be non-zero. (Thus, no two files will have the same Location of Extent. Within the context of a single media, Location of Extent will uniquely identify a given file.)

This field shall be recorded according to ISO 9660 7.3.3.

6. . . Number of File Identifiers (BP 55)

This field shall specify as an 8-bit number the number of identifiers in File Identifiers.

This field shall contain a value in the range 1 to 8.

This field shall be recorded according to ISO 9660 7.1.1.

7. . . File Identifiers (BP 56)

This field shall specify 0 to 7 Directory Identifiers followed by a File Identifier. Each identifier shall be preceded by an 8-bit number specifying its length. The (length,identifier) pairs shall be concatenated and left justified in the field, with the remainder of the field filled with (00) bytes.

The Directory Identifiers, taken from left to right, shall specify a path through the Directory Hierarchy (starting at the Root Directory) used to reach the Directory which should contain the Directory Record for the subject file. The File Identifier should replace the single (02) byte used in the Audited Directory Record.

The lengths shall be recorded according to ISO 9660 7.1.1. The identifiers shall be recorded in ASCII.

B . . . Potential File Directory Audit

The Potential File Directory Audit shall identify a file which is being written and will unconditionally be made permanent. Unless this Directory Audit Record is the last (most recent) Directory Audit Record, it should be ignored and will usually be followed by a corresponding File Description Directory Audit.

| BP | Field Name | Content |
|---|---|---|
| 1 | Directory Audit Type | numerical value |
| 2 to 11 | Standard Identifier | CDDIRAUDIT |
| 12 | Directory Audit Version | numerical value |
| 13 to 46 | Audited Directory Record | 34 bytes |
| 47 to 54 | Unused Field | (00) bytes |
| 55 | Number of File Identifiers | numerical value |
| 56 to 511 | File Identifiers | numerical values, d-characters, SEPARATOR 1 |

1. . . Directory Audit Type (BP 1)

This field shall specify an 8-bit number indicating that the Directory Audit Record is a Potential File Directory Audit.

The number in this field shall be 1.

This field shall be recorded according to ISO 9660 7.1.1.

2. . . Standard Identifier (BP 2).

This field shall identify the record as a Directory Audit Record.

The characters in this field shall be CDDIRAUDIT.

The characters in this field shall be recorded in ASCII.

3. . . Directory Audit Version (BP 12)

This field shall specify as an 8-bit number an identification of the version of the specification of the Potential File Directory Audit.

1 shall indicate this version.

This field shall be recorded according to ISO 9660 7.1.1.

4. . . Audited Directory Record (BP 13).

This field shall contain a Directory Record for the subject file. This Directory Record shall have a Directory Identifier consisting of a single (02) byte. The Data Length of this Directory Record shall be 0.

This field shall be recorded according to ISO 9660 9.1.

5. . . Unused Field (BP 47)

All bytes of this field shall be set to (00).

6. . . Number of File Identifiers (BP 55)

This field shall specify as an 8-bit number the number of identifiers in File Identifiers.

This field shall contain a value in the range 1 to 8.

This field shall be recorded according to ISO 9660 7.1.1.

7. . . File Identifiers (BP 56)

This field shall specify 0 to 7 Directory Identifiers followed by a File Identifier. Each identifier shall be preceded by an 8-bit number specifying its length. The (length,identifier) pairs shall be concatenated and left justified in the field, with the remainder of the field filled with (00) bytes.

The Directory Identifiers, taken from left to right, shall specify a path through the Directory Hierarchy (starting at the Root Directory) used to reach the Directory which should contain the Directory Record for the subject file. The File Identifier should replace the single (02) byte used in the Audited Directory Record.

The lengths shall be recorded according to ISO 9660 7.1.1. The identifiers shall be recorded in ASCII.

C . . . Discard Space Directory Audit

The Discard Space Directory Audit shall indicate that a sequence of Logical Blocks has been discarded, and is not part of any file. When a file is opened and an Extended Attribute Record and/or file data are written to the media, but the file is not made permanent, a Discard Space Directory Audit must be written to the directory audit structure, indicating the number of Logical Blocks written.

| BP | Field Name | Content |
|---|---|---|
| 1 | Directory Audit Type | numerical value |
| 2 to 11 | Standard Identifier | CDDIRAUDIT |
| 12 | Directory Audit Version | numerical value |
| 13 to 46 | Unused Field | (00) bytes |
| 47 to 54 | Waste Length | numerical value |
| 55 to 511 | Unused Field | (00) bytes |

1. . . Directory Audit Type (BP 1)

This field shall specify an 8-bit number indicating that the Directory Audit Record is a Discard Space Directory Audit.

The number in this field shall be 2.

This field shall be recorded according to ISO 9660 7.1.1.

2. . . Standard Identifier (BP 2)

This field shall identify the record as a Directory Audit Record.

The characters in this field shall be CDDIRAUDIT.

The characters in this field shall be recorded in ASCII.

3. . . Directory Audit Version (BP 12)

This field shall specify as an 8-bit number an identification of the version of the specification of the Discard Space Directory Audit.

1 shall indicate this version.

This field shall be recorded according to ISO 9660 7.1.1.

4. . . Unused Field (BP 13)

All bytes of this field shall be set to (00).

5. . . Waste Length (BP 47)

This field shall specify as a 32-bit number a number of unused Logical Blocks which have been discarded.

This field shall be recorded according to ISO 9660 7.3.3.

6. . . Unused Field (BP 55)

All bytes of this field shall be set to (00).

D . . . Freeze Directory Audit

The Freeze Directory Audit shall indicate that a freeze operation has been initiated for the media.

| BP | Field Name | Content |
|---|---|---|
| 1 | Directory Audit Type | numerical value |
| 2 to 11 | Standard Identifier | CDDIRAUDIT |
| 12 | Directory Audit Version | numerical value |
| 13 to 511 | Unused Field | (00) bytes |

1. . . Directory Audit Type (BP 1)

This field shall specify an 8-bit number indicating that the Directory Audit Record is a Freeze Directory Audit.

The number in this field shall be 3.

This field shall be recorded according to ISO 9660 7.1.1.

2. . . Standard Identifier (BP 2)

This field shall identify the record as a Directory Audit Record.

The characters in this field shall be CDDIRAUDIT.

The characters in this field shall be recorded in ASCII.

3. . . Directory Audit Version (BP 12)

This field shall specify as an 8-bit number an identification of the version of the specification of the Freeze Directory Audit.

1 shall indicate this version.

This field shall be recorded according to ISO 9660 7.1.1.

4. . . Unused Field (BP 13)

All bytes of this field shall be set to (00).

What is claimed is:

1. A method of writing to a write once storage medium, said method comprising:
    initializing said write once storage medium for I/O actions;
    reading medium management information from said write once storage medium, said medium management information including Directory Audit Records;
    constructing file management information using said medium management information;
    managing data recorded on said write once storage medium as a series of files, said files having a format used for a read only optical disc, said managing including writing said data to said write once storage medium in a read only optical disc format; and
    freezing said data on said write once storage medium which results in said write once storage medium having a read only optical disc format.

2. A method of writing to a write once storage medium, said method comprising:
    initializing said write once storage medium for I/O actions, said initializing comprising:
        (a) verifying that said write once storage medium is not in a read only state;
        (b) constructing a partial read only volume descriptor for said write once storage medium;
        (c) writing said partial read only volume descriptor to an area of said write once storage medium which is compatible with said read only disc format;
    reading medium management information from said write once storage medium;
    constructing file management information using said medium management information;
    managing data recorded on said write once storage medium as a series of files, said files having a format used for a read only optical disc; and
    freezing said data on said write once storage medium which results in said write once storage medium having a read-only optical disc format.

3. The method of claim 2 wherein wherein said managing includes updating said file management information and said medium management information each time a file is completed on said write once storage medium.

4. The method of claim 2 wherein said read only optical disc format is ISO 9660 standard format.

5. The method of claim 2 wherein said partial read only Volume descriptor conforms to the ISO 9660 standard.

6. The method of claim 2 wherein step (a) comprises the step of verifying that an ISO 9660 standard Primary Volume Descriptor is not present on the write once storage medium in conformance with the ISO 9660 standard.

7. The method of claim 2 wherein said freezing comprises the steps of:
    constructing a complete read only disc format directory from said file management directory;
    writing said complete read only disc format directory to an area of said write once storage medium which is compatible with said read only disc format;

8. The method of claim 7 wherein said read only disc format conforms to the ISO 9660 standard.

9. The method of claim 8 which further includes the steps of:
    constructing a complete ISO 9660 Primary Volume Descriptor; and
    writing said Primary Volume Descriptor to said write once storage medium in conformance with the ISO 9660 standard.

10. The method of claim 6 wherein said constructing of said file management information comprises the steps of:
    (a) extracting data from said write once storage medium management information;

(b) determining if the extracted data is a Directory Audit record and, if so, the type of said Directory Audit record;

(c) verifying that the size of the area referenced by said Directory Audit record is consistent with any previously read Directory Audit record references to said area if said Directory Audit record is a file type, a potential file type, or a discard type Directory Audit record;

(d) adding a node to said file management information if said Directory Audit record is not a freeze type Directory Audit record;

(e) repeating the steps a, b, c, and d if the extracted data is a file type, a potential file type or a discard type Directory Audit record;

(f) performing a freeze action if the extracted data is a freeze type Directory Audit record.

11. The method of claim 10 wherein said file management information contains the information necessary to create a ISO 9660 standard file directory.

12. The method of claim 10 which further includes the steps of:

(g) if no freeze type Directory Audit records have been encountered and no Directory Audit records remain to be read, verifying that the area immediately following the last valid data area is virgin medium;

(h) if said area immediately following said last valid data area is not virgin medium, performing a search for the end of the non-blank area above said last valid data area written, said search ending if the end of the area available for data is encountered without a virgin area being found;

(i) creating a discard type Directory Audit record describing said non-blank area detected by said search; and (j) writing said discard type Directory Audit record to said medium management information on said write once storage medium.

13. The method of claim 10 which further includes the steps of:

(g) if no freeze type Directory Audit records have been encountered and no Directory Audit records remain to be read, verifying that the area immediately following the last valid data area is virgin medium;

(h) if said area immediately following said last valid data area is not virgin medium, performing a search for the end of the non-blank area above said last valid data area written, said search ending if the end of the area available for data is encountered without a virgin area being found; and (i) establishing said non-blank area detected by said search as a pending protected file if the last Directory Audit record read from said medium management information was a potential file type Directory Audit record.

14. The method of claim 2 including the step of writing data to a file comprising the steps of:

determining the length of said data to be written;

determining if sufficient space is available on said write once storage medium to accomplish said write;

selecting a destination area on said write once storage medium for the data to be written if the result of the previous step indicated that sufficient space is available;

transferring said data to said destination area on said write once storage medium;

constructing a Directory Audit record describing said one of said files; writing said Directory Audit record to said medium management information on said write once storage medium.

15. The method of claim 14 further including the step of:

constructing a potential file type Directory Audit record before any data is transferred to said write once storage medium for said one of said files; and writing said potential file Directory Audit record to said medium management information on said write once storage medium.

16. The method of claim 14 wherein the area comprising said data written on said write once storage medium grows linearly toward the area for said medium management information written on said write once storage medium.

17. A system comprising:

disc driving means for driving a disc on which data and disc management information for said data are recorded;

I/0 management means for managing said data and said medium management information recorded on said disc wherein said data is managed as a series of files with a format of a read only optical disc;

writing means, coupled to said disc driving means and said disc I/0 management means, for writing said data and said disc management information to said disc in response to said I/0 management means;

reading means, coupled to said disc driving means and to said I/0 management means, for reading said data and said medium management information; and storage means, coupled to said I/0 management means, said storage means containing file management information used to manage said files with a format of a read only optical disc wherein said file management information includes Write Phase records and is constructed by said I/O management means using said medium management information from said disc and wherein said I/0 management means updates said file management information and said medium management information each time a file is completed on said disc.

18. A system comprising:

disc driving means for driving a disc on which data and disc management information for said data are recorded;

I/O management means for managing said data and said medium management information recorded on said disc wherein said data is managed as a series of files with a format of a read only optical disc;

writing means, coupled to said disc driving means and said disc I/O management means, for writing said data and said disc management information to said disc in response to said I/O management means, said disc management information including Directory Audit Records;

reading means, coupled to said disc driving means and to said I/O management means, for reading said data and said medium management information; and storage means, coupled to said I/O management means, said storage means containing file management information used to manage said files with a format of a read only optical disc wherein said file management information is constructed by said I/O management means using said medium management information from said disc and wherein said I/O management means updates said file management information and said medium management information each time a file is completed on said disc.

19. The system of claim 18 wherein said format of a read only optical disc is the ISO 9660 standard format.

* * * * *